United States Patent [19]
Willsie

[11] Patent Number: 5,233,820
[45] Date of Patent: Aug. 10, 1993

[54] LAWNMOWER BLADE

[76] Inventor: Raymond W. Willsie, Rte. 1 Box 39 A-6, Ashdown, Ark. 71821

[21] Appl. No.: 992,549

[22] Filed: Dec. 18, 1992

[51] Int. Cl.$^5$ .................. A01D 34/64; A01D 34/73
[52] U.S. Cl. .................................. 56/255; 56/295; 56/DIG. 17; 56/DIG. 20
[58] Field of Search ............. 56/295, 255, 13.4, 12.7, 56/DIG. 9, DIG. 17, DIG. 20

[56] References Cited

U.S. PATENT DOCUMENTS

| | | | |
|---|---|---|---|
| 2,547,540 | 4/1951 | Roberts | 56/25.4 |
| 2,669,084 | 2/1954 | Warren | 56/295 |
| 2,721,438 | 10/1955 | O'Maley | 56/295 |
| 2,734,327 | 2/1956 | Whitney | 56/25.4 |
| 2,924,058 | 2/1960 | Brooks | 56/295 |
| 3,217,812 | 11/1965 | Gallion | 56/295 X |
| 3,247,657 | 4/1966 | Scarnato et al. | 56/295 |
| 3,415,047 | 12/1968 | Blecke | 56/295 |
| 3,500,622 | 3/1970 | Bowen | 56/295 |
| 3,835,630 | 9/1974 | Au | 56/295 |
| 4,257,214 | 3/1981 | Ferguson | 56/13.4 |
| 4,290,258 | 9/1981 | Gobler | 56/295 |
| 4,306,407 | 12/1981 | Dambroth | 56/193 |
| 4,374,465 | 2/1983 | Comer | 56/12.7 |
| 4,375,148 | 3/1983 | Beck | 56/295 |
| 4,594,843 | 6/1986 | Anderson et al. | 56/295 |
| 4,715,173 | 12/1987 | Anderson | 56/295 |
| 4,922,697 | 5/1990 | Paiva et al. | 56/295 |
| 5,036,654 | 8/1991 | Malutich | 56/255 |

Primary Examiner—Stephen J. Novosad
Attorney, Agent, or Firm—John M. Harrison

[57] ABSTRACT

A lawnmower blade which is characterized by an elongated, flat blade bar having a slight twist and fitted with a blower element at each end, along with pivotally or rotatably-mounted cutter discs. Each blower element includes a base plate secured to the blade bar and terminating in an extending blower top plate having top plate serrations on the end thereof. In a first preferred embodiment a perforated cutter disc is secured to each end of the blade bar beneath the blower element by means of a shoulder bolt which extends through one of six perforations to facilitate pivotally and eccentrically mounting the perforated cutter discs to the blade bar. In a second preferred embodiment a two-piece cutter disc is rotatably mounted on each end of the blade bar through an enlarged center opening. The perforated cutter discs and the two-piece cutter discs are provided with double-edged blade teeth to facilitate reversible mounting of the perforated cutter discs and the two-piece cutter discs on the ends of the blade bar.

20 Claims, 1 Drawing Sheet

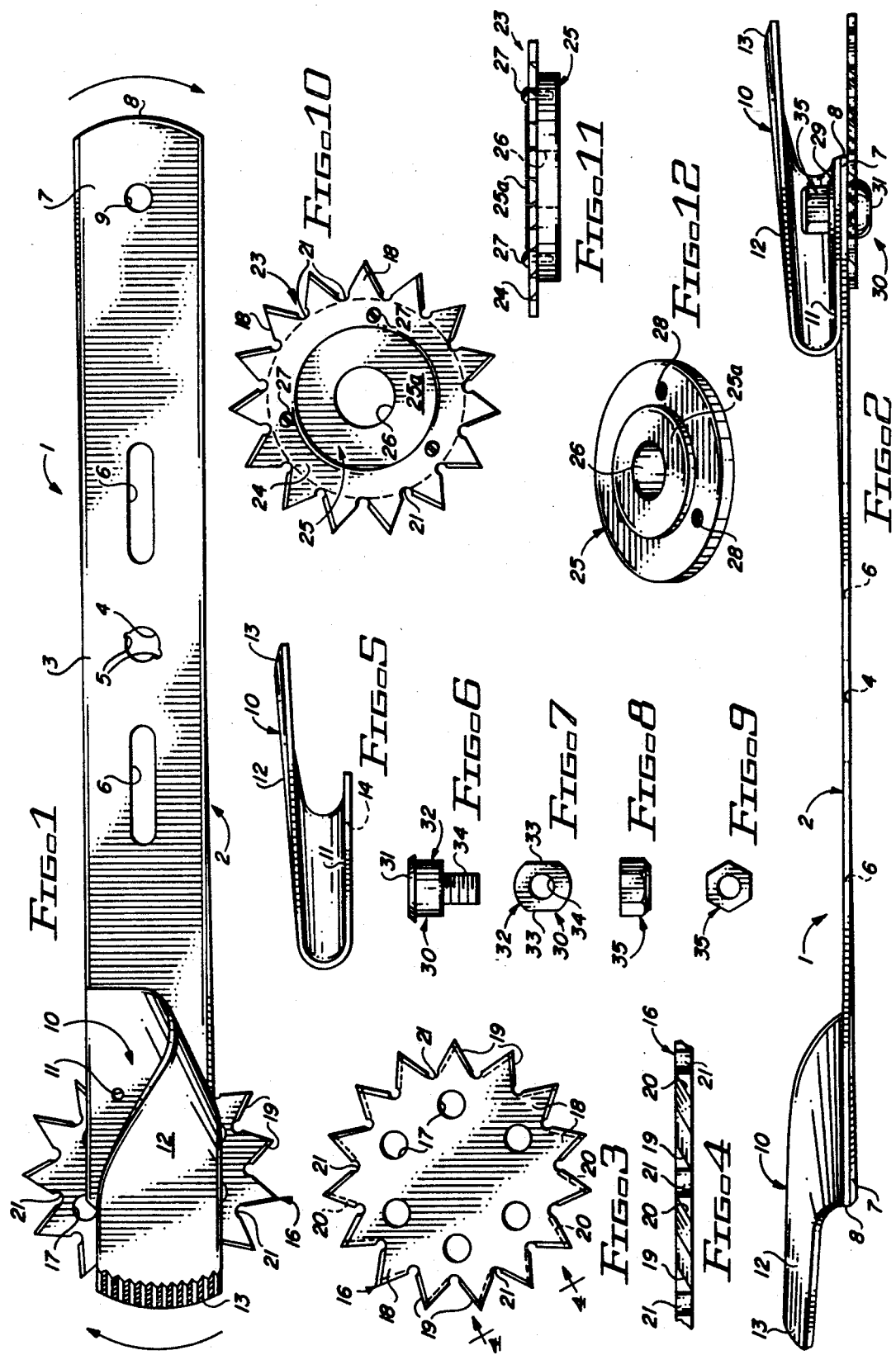

LAWNMOWER BLADE

BACKGROUND OF THE INVENTION

1. Field of the Invention

This invention relates to lawnmower blades, and more particular, to a new and improved lawnmower blade having a flat blade bar provided with a slight twist or warp and fitted with pivotally or rotatably-mounted cutter discs on each end. Also mounted on each end of the blade bar are fixed blower elements which act as "grass kickers" to provide optimum expulsion of cut grass from the underside or shroud of the lawnmower during rotation of the blade. Accordingly, the rotatably or pivotally-mounted, either perforated or two-piece, cutter discs are complimented by cooperating grass blower elements which are fixed on the ends of the lawnmower blade by means of shoulder bolts to facilitate pivotal or rotatable movement of the cutter discs. These blower elements extend above the ends of the blade bar and the cutter discs to direct the cut grass outwardly and downwardly of the cutter discs, in order to better facilitate expulsion of the grass clippings from beneath the lawnmower housing or shroud. In a preferred embodiment of the invention the blower elements are provided with serrated teeth on the ends thereof to more efficiently aid in cutting the grass and the curved design of the blower elements, along with the slightly warped blade bar, directs the cut grass outwardly and downwardly out of the cutting zone in an optimum manner.

DESCRIPTION OF THE PRIOR ART

Lawnmower blades for rotary gasoline or electric powered lawnmowers are typically shaped from a single blade arm having the outer, leading edges sharpened in order to contact and cut the grass upon rotation of the blade arm or bar. These blade bars must be periodically removed from the machine and sharpened in order to maintain good efficiency in cutting grass and the blades are designed to slice the grass upon direct frontal contact with the grass blades, with no provision for directing the grass from the interior of the lawnmower housing. One of the problems associated with conventional lawnmower blades is the susceptibility of the blades to denting and dulling, which result from striking hard objects such as rocks or the edges of concrete walkways. Furthermore, even with careful conventional use, the blade edges rapidly become dull due to corrosion and impact with weeds and small sticks and must be frequently sharpened in order to maintain good cutting efficiency. Furthermore, conventional rotary power mowers are not able to cut wet grass with any reasonable efficiency, since the wet grass clippings tend to compact and collect on the underside of the mower housing or shroud and impede rotation of the blade arm or bar. This occurrence frequently causes the motor or engine to overload and die and subsequent starting of the motor or engine is rendered difficult without cleaning the matted grass from beneath the housing.

Various lawnmower blades of varying design are known in the art. Typical of these is the "Power Mower" detailed in U.S. Pat. No. 2,547,540, dated Apr. 3, 1951, to W. T. Roberts. The power mower utilizes a cutting blade having a pair of offset cutter bars at each end which cut the grass by rotation of the blade. U.S. Pat. No. 2,669,084, dated Feb. 16, 1954, to Madden N. Warren, details a "Rotary Mower Blade" fitted with a pair of pivotally-mounted cutter blade ends, each having an upward-turned edge and an oppositely-disposed curved edge for cutting grass pursuant to rotation in the blade. U.S. Pat. No. 2,721,438, dated Oct. 25, 1955, to C. V. O'Maley, details a "Rotary Power Lawnmower Cutter" characterized by a pair of triangular-shaped offset cutter blades bolted to the curved ends of a primary blade which is bolted to the lawnmower shaft. Grass is cut primarily by the triangular-shaped blades as the shaft rotates. A "Lawn Mower" is detailed in U.S. Pat. No. 2,734,327, dated Feb. 14, 1956, to B. A. Whitney. The lawnmower utilizes a blade fitted with blade tips having deflector vanes and disposed with its cutting edge oriented at approximately 45° to the longitudinal axis of the mount arm. The blades cut grass and weeds pursuant to rotation of the arm, which is attached to the lawnmower shaft. A "Cross Flow Rotary Mower" is detailed in U.S. Pat. No. 4,257,214, dated Mar. 24, 1981, to Hugo S. Ferguson, et al. The mower includes a cutting blade with outer cutter edges and upwardly-extending blower vanes. The vanes create a vortex airflow within the shroud and force-controlled retractable blades are mounted on a blade carrier to enable the use of thin blades requiring no sharpening. U.S. Pat. No. 4,290,258, dated Sep. 22, 1981, to Hans Gobler, details a lawnmower blade having a substantially flat center portion and a hump or riser shaped in the outer portion of the blade, which riser or hump tapers to define a cutting edge. The hump aids in the ejection of grass from the lawnmower housing or shroud. U.S. Pat. No. 4,306,407, dated Dec. 22, 1981, to J. Dambroth, details a "Lawn Care Device" which includes rotary cutter blades mounted onto the vertically-disposed drive shaft of a conventional lawnmower. Support beams include receiving members, support-like bars, trunions and the like for pivotally mounting work tools thereon. The work tools are moved into an operating position by forces resulting from the rotation of the support beam and are pivoted to a non-operative position when engaging an obstacle. An "Attachment For Rotary Lawn Mower" is detailed in U.S. Pat. No. 4,374,465, dated Feb. 22, 1983, to Robert C. Comer. The rotary lawnmower includes a rigid cutting blade which is rotatable in a housing and a filament holder is releasably attached to the blade through an aperture by a mounting tab neck and collar. The filament holder contains a filament which extends beyond the housing and provides a trimming function when the blade rotates. U.S. Pat. No. 4,375,148, dated Mar. 1, 1983, to Carl E. Beck, details a mower blade which includes cutting elements that are removably attached to a base member. The removable elements are constructed of a higher quality steel than the base member and may be easily removed for sharpening or replace with a new element. The removable element is held in the base member by means of a wedged slot which cooperates with a wedged part of the shank of the removable cutting element, while a notch in the base member serves to hold the back of the blade. A "Lawn Mower Knife Assembly" is detailed in U.S. Pat. No. 4,594,843, dated Jun. 17, 1986, to Roger Andersson, et al. The knife assembly includes a rigid bar, plate or disc attached to a motor-driven vertical shaft and provided at a distance from the shaft attachment. At least two attachment points for attaching a knife and at least two knife elements, each including a blade section provided with a cutting edge and a shank section, are adapted for fixation of the knife to the bar plate or sheath. Grass and weeds are cut by the knife pursuant to rotation of the bar, plate or sheath. U.S. Pat. No. 4,715,173, dated Dec. 29, 1987, to James Anderson, details "Rotary Lawn Mower Accessories". The accessories are adapted for use with a rotary lawnmower in which the conventional bar having oppositely-facing cutting edges is replaced with an accessory bar, to which a variety of grass grooming accessories can be easily attached. Accordingly, the accessory bar may accommodate replaceable grass cutting elements, grass mulching elements and lawn power raking elements. U.S. Pat. No. 4,922,967, dated May 8, 1990, to Anthony J. Piava, et al, details a "Cutting Attachment for Rotary Mower Blades and Use". The cutting attachment includes a tubular base adapted for attachment to a flat mower blade, a C-shaped cutting plate having a straight upper edge at the top of the C and a straight edge at the bottom of the C and two substantially semicircular side edges, the straight edge at the top of the C being fixedly attached to the side of the base and the straight edge at the bottom of the C forming a sharp cutting edge, a portion of the interior of the cutting plate being removed to permit passage of cut material. A "Replaceable Cutting Blade For Rotary Lawn Mower" is detailed in U.S. Pat. No. 5,036,654, dated Aug. 6, 1991, to William J. Malutich. The removabie cutters are mounted at each end of a rotary lawnmower blade, which cutters are held in place by a positive locking arrangement, including a safety lock. During operation, the centrifical force of the rotating blade further locks the cutters in place and an air-deflecting vane aids in creating a suction action to pull the grass to an erect position and enhance discharge of the grass clippings from the mower shroud.

It is an object of this invention to provide a new and improved lawnmower blade which includes pivotal or rotatable cutter discs mounted on the end of a flat blade bar, with teeth spaced around the periphery of the discs and fitted with dual cutting edges to facilitate reversible mounting of the cutter discs on the lawnmower blade bar.

Another object of the invention is to provide a new and improved lawnmower blade which is characterized by a slightly twisted or warped blade bar fitted with rotatable or eccentrically pivotable cutter discs on each end and fixed, U-shaped blower elements, for first cutting grass and then directing the cut grass downwardly and from the interior housing of the power mower.

Still another object of the invention is to provide a new and improved lawnmower blade for rotary powered lawnmowers, which blade includes a warped blade bar fitted with a pair of perforated cutter discs mounted in eccentric, pivotally disposed relationship on the ends of the blade bar and U-shaped blower elements bolted to the ends of the blade bar above the perforated cutter discs for cutting the grass and directing the stream of cut grass away from the cutting zone and from the lawnmower housing, to increase the efficiency of the cutting operation.

Still another object of this invention is to provide a new and improved lawnmower blade fitted with an elongated blade bar having a twist or warp and provided with a two-piece cutter disc rotatably mounted at the center thereof to the ends of the blade bar and a fixed U-shaped blower element mounted above each two-piece cutter disc for initially cutting the grass and then directing the grass downwardly out of the cutting area and from beneath the lawnmower housing.

Still another object of this invention is to provide a lawnmower blade for powered lawnmowers which is characterized by a blade bar having a slight warp from end to end and mounted in the center to the shaft of the lawnmower motor, a pair of multi-perforated cutter discs pivotally and eccentrically attached to the extending ends of the blade bar by shoulder bolts and fitted with double-edged teeth for reversible mounting to the blade bar and a pair of fixed blower elements also attached to the ends of the blade bar by the shoulder bolts and having a U-shaped configuration to divert grass clippings severed by the cutting disc away from the cutting zone.

SUMMARY OF THE INVENTION

These and other objects of the invention are provided in a new and improved lawnmower blade for power lawnmowers, which blade is characterized in a preferred embodiment by an elongated blade bar having a slight longitudinal warp or twist therein and mounted to the lawnmower engine shaft at the blade center. A pair of cutter discs are rotatably center-mounted to the ends of the blade bar beneath fixed, U-shaped blower elements in a first preferred embodiment, wherein grass cut by the cutter discs is routed from the shroud or housing of the lawnmower by the blower elements. In a second preferred embodiment perforated cutter discs are mounted on the blade bar in eccentrically-pivoting relationship at one of six perforations and in both embodiments the cutter discs are mounted on each end of the blade bar along with the blower elements, by means of shoulder bolts, washers and nuts.

BRIEF DESCRIPTION OF THE DRAWING

The invention will be better understood by reference to the accompanying drawing, wherein:

FIG. 1 is a top view of an elongated flat blade bar fitted with a pivotally-mounted perforated cutter disc at one end and a blower element fixed to the same end of the blade bar above the perforated cutter disc;

FIG. 2 is a side view of the blade bar illustrated in FIG. 1, more particularly illustrating a preferred warp in the blade bar and showing a perforated cutter disc and blower elements of the lawnmower blade;

FIG. 3 is a top view of a preferred perforated cutter disc element of the lawnmower blade;

FIG. 4 is a side sectional view of a portion of the perforated cutter disc illustrated in FIG. 3, more particularly illustrating a preferred tooth configuration;

FIG. 5 is a side view of a preferred blower element of the lawnmower blade of this invention;

FIG. 6 is a side view of a typical shoulder bolt for receiving and mounting the blower element and perforated cutter discs, as well as the two-piece cutter discs, on the ends of the blade bar illustrated in FIGS. 1 and 2;

FIG. 7 is a bottom view of the shoulder bolt illustrated in FIG. 6;

FIG. 8 is a side view of a preferred locking nut for securely seating the blower elements on each end of the blade bar and a cutter disc in rotatable or pivotal relationship on each end of the blade bar;

FIG. 9 is a top view of the locking nut illustrated in FIG. 8;

FIG. 10 is a top view of an alternative two-piece cutter disc which may be mounted on each end of the blade bar through the oversized center opening thereof;

FIG. 11 is a side view of the two-piece cutter disc illustrated in FIG. 10; and

FIG. 12 is a perspective view of a mount disc for mounting the two-piece cutter discs on the blade bar.

DESCRIPTION OF THE PREFERRED EMBODIMENTS

Referring initially to FIGS. 1-9 of the drawings, in a first preferred embodiment of the invention the lawnmower blade of this invention is generally illustrated by reference numeral 1. The lawnmower blade 1 is characterized by a flat, elongated blade bar 2 having a slight twist or warp, as illustrated in FIGS. 1 and 2. The bar center 3 of the blade bar 2 is fitted with a blade mount opening 4, provided with oppositely-disposed key slots 5 for mounting the blade bar 2 on the motor shaft of a conventional lawnmower motor or engine (not illustrated). Mount slots 6 are also provided in spaced relationship on each side of the blade mount opening 4 to complete the mounting of the blade bar 2 on the motor or engine shaft. The bar ends 7 are curved to define a bar end curvature 8, the radius of which will vary with the length of the blade bar 2. A disc mount opening 9 is provided in each of the bar ends 7, spaced from the bar end curvature 8 and is designed to receive the threaded shank 34 of a shoulder bolt 30, having a shoulder bolt head 32, with wrench flats 33 and terminated by a shoulder bolt cap 31, as illustrated in FIGS. 6 and 7. The shoulder bolt 30 is designed to secure a perforated cutter disc 16 on each of the bar ends 7 of the blade bar 2 in eccentrically pivoting relationship and to mount a grass blower 10 on each of the bar ends 7 of the blade bar 2 in fixed relationship. Each grass blower 10 is characterized by a flat blower base plate 11 mounted to one of the bar ends 7 of the blade bar 2, respectively, and a blower top plate 12 which curves from the blower base plate 11 and terminates in multiple top plate serrations 13. Each blower top plate 12 extends approximately even with the outer blade teeth 18, about $\frac{1}{8}$ of an inch above the perforated cutter disc 16, to aid in the cutting function as the blade bar 2 rotates. The base plate opening 14 provided in the blower base plate 11 accommodates the threaded shank 34 of the shoulder bolt 30 to facilitate securing a grass blower 10 to each of the bar ends 7 of the blade bar 2, as illustrated in FIG. 2. Similarly, each perforated cutter disc 16 is provided with six equally spaced, circular perforations 17, one of which is chosen to receive the threaded shank 34 of the shoulder bolt 30 to pivotally secure a perforated cutter disc 16 on each of the bar ends 7 of the blade bar 2 in eccentrically pivoting relationship. Each of the perforated cutter discs 16 further includes multiple, and preferably 15, blade teeth 18 arranged around the periphery of the perforated cutter discs 16. Each of the blade teeth 18 further includes a top tooth bevel 19 and a bottom tooth bevel 20 and the blade teeth 18 are spaced by curved tooth gaps 21, as illustrated in FIG. 3. The double sharpened blade teeth 18 facilitate reversible and sequential mounting of the perforated cutter discs 16 on the bar ends 7 of the blade bar 2 using each of the six perforations 17 in sequence, which insures longevity of the perforated cutter discs 16 without the necessity of replacing the perforated cutter discs 16 or even sharpening them. Accordingly, six separate cutting positions are presented on each side of each of the perforated cutter discs 16, for a total of 12 different cutting positions. However, it will be appreciated by those skilled in the art that the top tooth bevel 19 and bottom tooth bevel 20 can be easily sharpened, either manually or automatically, at a bevel angle of about 35 degrees by tools well known to those skilled in the art if such sharpening is desired.

In an alternative preferred embodiment of the invention, FIGS. 10-12 illustrate a two-piece cutter disc which is characterized by a tooth disc 24, fitted with spaced blade teeth 18 oriented in substantially the same configuration and number as the blade teeth 18 illustrated in FIGS. 3 and 4 on the perforated cutter disc 16. Accordingly, each of the blade teeth 18 on the tooth disc 24 of the two-piece cutter 23 are characterized by a top tooth bevel 19, bottom tooth bevel 20 and tooth gap 21, as illustrated. The tooth disc 24 is secured to a mount disc 25, isolated in FIG. 12, by means of disc mount bolts 27, threaded into corresponding mount bolt openings 28. A mount disc opening 26 is provided in the disc flange 25a of the mount disc 25 to receive the threaded shank 34 of the shoulder bolt 30 and rotatably secure the two-piece cutter discs 23 on the bar ends 7 of the blade bar 2. In a most preferred embodiment of the invention the diameter of each mount disc opening 26 is larger than the diameter of the threaded shank 34 to facilitate eccentric rotation of the two-piece cutter disc 23 on the threaded shank 34 pursuant to rotation of the blade bar 2 during normal operation of the lawnmower blade 1. It has been surprisingly found that this mounting of the two-piece cutter disc 23 on the threaded shank 34 greatly increases the cutting efficiency of the two-piece cutter disc 23 in operation. It will be appreciated that each two-piece cutter disc 23 is mounted on a bar end 7 of the blade bar 2 by means of a shoulder bolt 30, having a threaded shank 34 extending through the mount disc opening 26, and secured by a washer 29 and a locking nut 35, with the heads of the multiple disc mount bolts 27 projecting downwardly. This mounting orientation facilitates quick and easy removal of the disc mount bolts 27 from the mount disc 25, to remove each two-piece cutter disc 23 from the corresponding mount disc 25 without removing the shoulder bolt 30.

Referring again to FIGS. 1 and 2 of the drawings, although the grass blower 10 mounted on each of the bar ends 7 of the blade bar 2 are each fixed in position by means of a shoulder bolt 30, a companion locking nut 35 and a washer 29, under circumstances when the grass blower 10 strikes a heavy or immovable object such as a pipe or brick walkway, the blowers 10 will pivot on the shoulder bolts 30 and minimize damage to the lawnmower blade 1. Furthermore, it is understood that since the perforated cutter discs 16 or two-piece cutter discs 23 are pivotally or rotatably attached to the blade bar 2, striking of such a heavy immovable object by these elements simply pivots the perforated cutter discs 16 or rotates the two-piece cutter discs 23 on the shoulder bolts 30 and minimizes damage to the projecting blade teeth 18. Moreover, under circumstances where the top tooth bevel 19 the blade teeth 18 are dulled over a period of time during the cutting operation, the perforated cutter discs 16 can be advanced to the adjacent perforation 17 and both the perforated cutter discs 16 and the two-piece cutter disc 23 can be reversed to expose the bottom tooth bevel 20 to the grass and present a fresh sharp cutting surface, as heretofore described.

In another preferred embodiment of the invention the top plate serrations 13 provided in the extending ends of the blower top plate 12 of the blower 10 are bevelled at an angle of about 30° from base to point, to provide an optimum cutting edge for minimum dulling during the cutting operation. The top plate serrations 13 present a large surface area for cutting and are therefore more efficient even after being dulled, than a conventional blade and serve to help the perforated cutter discs 16 or two-piece cutter discs 23 cut heavy grass and weeds more efficiently. Furthermore, in a most preferred embodiment of the invention the grass blowers 10 are interchangeable on the bar ends 7 of the blade bar 2.

It will be further appreciated by those skilled in the art that the slight twist or warp provided in the blade bar 2 of the lawnmower blade 1 angles each grass blower 10 slightly downwardly to facilitate blowing grass clippings and particles which are cut by the perforated cutter discs 16 or the two-piece cutter discs 23 downwardly and from the interior of the lawnmower shroud. It has been found that this curved U-shaped configuration of the grass blowers 10 provides optimum efficiency in removing grass cuttings, including wet grass and cuttings, from the lawnmower shroud to prevent undesirable accumulation of grass inside the shroud, particularly in the upper cavity of the shroud.

The lawnmower blade of this invention is characterized by great efficiency, in that it can be manufactured for and used on substantially any rotary powered lawnmower, including mowers fitted with both electric motors and gasoline engines. Furthermore, both the perforated cutter discs 16 and two-piece cutter discs 23, as well as the grass blower 10, can be quickly and easily replaced or cleaned by removing only two shoulder bolts 30, located at the bar ends 7 of the blade bar 2. The lawnmower blade 1 is therefore easily serviceable over a long period of time with minimum maintenance requirements.

The lawnmower blade 1 is highly cost-effective, since only the perforated cutter discs 16 or two-piece cutter discs 23 must be replaced, and this replacement is long deferred due to the adjustable and reversible features of these cutter blades, to compensate for wear on the respective blade teeth 18.

Accordingly, while the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A lawnmower blade for mounting on a powered rotary lawnmower, comprising:
   (a) an elongated blade bar mounted for rotary operation on the lawnmower;
   (b) a circular cutter blade pivotally and rotatably secured to each end of said blade bar and a plurality of teeth provided on the periphery of said cutter blade for cutting grass and weeds; and
   (c) a generally U-shaped grass blower secured to each end of said blade bar and shaped to extend above and at least partially over said cutter blade, respectively, for removing cut grass and weeds.

2. The lawnmower blade of claim 1 wherein said blade bar is twisted or warped.

3. The lawnmower blade of claim 1 wherein said grass blower further comprises a base plate secured to said blade bar and a top plate curving from said base plate into a position spaced from said base plate.

4. The lawnmower blade of claim 1 wherein:
   (a) said blade bar is twisted or warped; and
   (b) said grass blower further comprises a base plate secured to said blade bar and a top plate curving from said base plate into a position spaced from said base plate.

5. The lawnmower blade of claim 1 wherein said cutter blade is pivotally secured in off-center, eccentric relationship to said blade bar.

6. The lawnmower blade of claim 1 wherein:
   (a) said blade bar is twisted or warped along the longitudinal axis thereof;
   (b) said grass blower further comprises a base plate secured to said blade bar, a top plate curving from said base plate into a position spaced from said base plate and top plate serrations provided on said top plate for cutting the grass and weeds; and
   (c) said cutter blade is pivotally secured in off-center, eccentric relationship to said blade bar.

7. The lawnmower blade of claim 1 wherein said cutter blade is rotatably secured substantially at the center thereof to said blade bar.

8. The lawnmower blade of claim 1 wherein:
   (a) said blade bar is twisted or warped along the longitudinal axis thereof;
   (b) said grass blower further comprises a base plate secured to said blade bar, a top plate curving from said base plate into a position spaced from said base plate and top plate serrations provided on said top plate for cutting the grass and weeds; and
   (c) said cutter blade is rotatably secured substantially at the center thereof to said blade bar.

9. The lawnmower blade of claim 1 further comprising fastening means extending through said blade bar and said cutter blade for securing said cutter blade to said blade bar.

10. The lawnmower blade of claim 9 wherein:
    (a) said blade bar warped along the longitudinal axis thereof; and
    (b) said grass blower further comprises a base plate secured to said blade bar and a top plate curving from said base plate into a position spaced from said base plate.

11. The lawnmower blade of claim 10 wherein said cutter blade is pivotally secured in off-center, eccentric relationship to said blade bar.

12. The lawnmower blade of claim 10 wherein said cutter blade is rotatably secured substantially at the center thereof to said blade bar.

13. A lawnmower blade for mounting on the motor shaft of a powered lawnmower, comprising:
    (a) an elongated, flat, warped blade bar secured to the motor shaft for rotary operation and a bar mount opening provided in each end of said blade bar;
    (b) a pair of circular perforated cutter discs and a plurality of perforations arranged in circular fashion on said perforated cutter discs, with one of said perforations aligned with said bar mount opening on each end of said blade bar;
    (c) a generally U-shaped grass blower provided on each end of said blade bar and a blower mount opening provided in said grass blower, said blower mount opening aligned with said one of said perforations in said perforated cutter discs and said bar mount opening in each end of said blade bar; and
    (d) fastening means projecting through said bar mount opening, said one of said perforations and said blower mount opening for fixedly attaching said grass blower to said each end of said blade bar and attaching said perforated cutter discs to said each end of said blade bar in off-center, eccentrically pivotal relationship.

14. The lawnmower blade of claim 13 wherein said grass blower further comprises a base plate secured to said blade bar and a top plate curving from said base plate into a position spaced from said base plate.

15. The lawnmower blade of claim 13 wherein said fastening means comprises a shoulder bolt, a washer and a nut threaded on said shoulder bolt.

16. The lawnmower blade of claim 13 wherein:
 (a) said grass blower further comprises a base plate secured to said blade bar and a top plate curving from said base plate into a position spaced from said base plate; and
 (b) said fastening means comprises a shoulder bolt, a washer and a nut threaded on said shoulder bolt.

17. A lawnmower blade for mounting on the motor shaft of a powered lawnmower, comprising:
 (a) an elongated, flat, warped blade bar secured to the motor shaft for rotary operation and a bar mount opening provided in each end of said blade bar;
 (b) a pair of circular two-piece cutter discs and a mount disc opening provided in the center of said two-piece cutter discs, and said mount disc opening aligned with said bar mount opening on each end of said blade bar;
 (c) a generally U-shaped grass blower provided on each end of said blade bar and a blower mount opening provided in said grass blower, said blower opening aligned with said mount disc opening in said two-piece cutter discs and said bar mount opening in each end of said blade bar; and
 (d) fastening means projecting through said bar mount opening, said blower mount opening and said bar mount opening for fixedly attaching said grass blower to said each end of said blade bar and attaching said two-piece cutter disc to said each end of said blade bar in rotatable relationship.

18. The lawnmower blade of claim 17 wherein said grass blower further comprises a base plate secured to said blade bar and a top plate curving from said base plate into a position spaced from said base plate.

19. The lawnmower blade of claim 17 wherein said fastening means comprises a shoulder bolt, a washer and a nut threaded on said shoulder bolt.

20. The lawnmower blade of claim 17 wherein:
 (a) said grass blower further comprises a base plate secured to said blade bar and a top plate curving from said base plate into a position spaced from said base plate; and
 (b) said fastening means comprises a shoulder bolt, a washer and a nut threaded on said shoulder bolt.

* * * * *